United States Patent [19] [11] 4,122,532

Dlugos et al. [45] Oct. 24, 1978

[54] SYSTEM FOR UPDATING POSTAL RATE INFORMATION UTILIZED BY REMOTE MAIL PROCESSING APPARATUS

[75] Inventors: Daniel F. Dlugos, Huntington; Flavio M. Manduley, Seymour, both of Conn.

[73] Assignee: Pitney-Bowes, Inc., Stamford, Conn.

[21] Appl. No.: 763,998

[22] Filed: Jan. 31, 1977

[51] Int. Cl.[2] .......................... G06F 3/04; G06F 15/20

[52] U.S. Cl. ...................................... 364/900; 177/25; 177/5

[58] Field of Search ... 364/200 MS File, 900 MS File, 364/567, 406, 409; 340/150, 148; 235/151.33; 343/175; 177/25, 5; 179/2 C; 325/26, 66, 311

[56] References Cited

U.S. PATENT DOCUMENTS

| | | | |
|---|---|---|---|
| 3,602,891 | 8/1971 | Clark et al. | 364/900 |
| 3,635,297 | 1/1972 | Salava | 235/151.33 X |
| 3,651,471 | 3/1972 | Haselwood et al. | 364/900 |
| 3,792,446 | 2/1974 | McFiggins et al. | 364/900 |
| 3,858,181 | 12/1974 | Goldsby et al. | 340/150 |
| 3,885,217 | 5/1975 | Cintron | 325/26 |
| 3,938,095 | 2/1976 | Check et al. | 364/900 |
| 3,944,724 | 3/1976 | Kilby et al. | 325/311 X |
| 3,978,457 | 8/1976 | Check et al. | 364/200 |

*Primary Examiner*—Mark E. Nusbaum
*Attorney, Agent, or Firm*—Peter Vrahotes; William D. Soltow, Jr.; Albert W. Scribner

[57] ABSTRACT

A system for replacing obsolete postal rate data with new data used by a remote mail processing apparatus comprises a central data processor for generating the new data. An encoder translates the new data into electronic tone signals which are transmitted to the remote apparatus by, for example, telephone transmission lines. The electronic tone signals are translated back into new data by a decoder. A memory incorporated in the remote apparatus is equipped to store obsolete or new data at a plurality of storage locations and a programming transfer controller, which interconnects the decoder and memory, sequentially addresses each of the locations storing obsolete data, erases the obsolete data, and loads new data into the addressed location.

3 Claims, 1 Drawing Figure

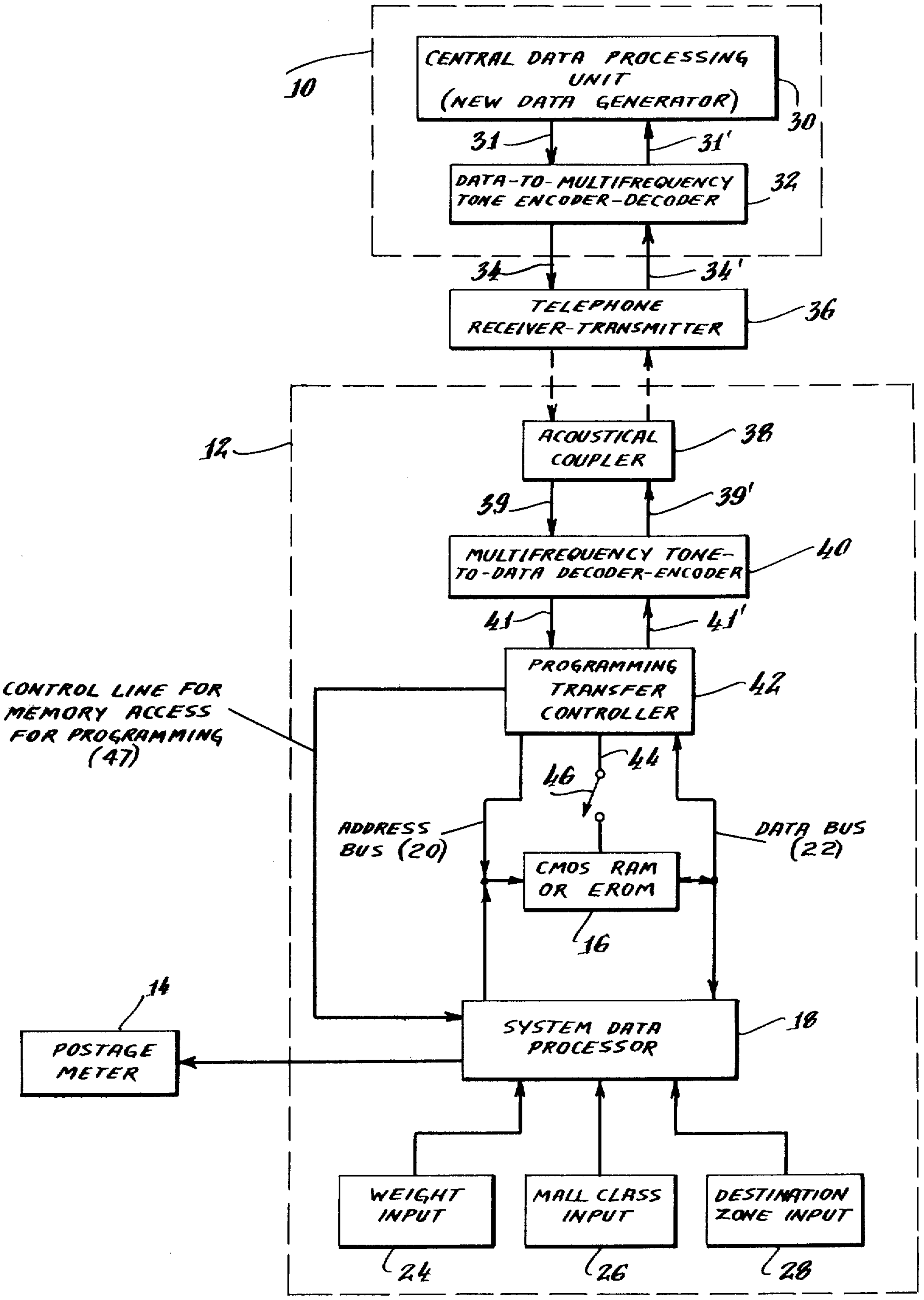
CENTRAL DATA PROCESSING UNIT (NEW DATA GENERATOR)
10
30
31
31'
DATA-TO-MULTIFREQUENCY TONE ENCODER-DECODER
32
34
34'
TELEPHONE RECEIVER-TRANSMITTER
36
12
ACOUSTICAL COUPLER
38
39
39'
MULTIFREQUENCY TONE-TO-DATA DECODER-ENCODER
40
41
41'
PROGRAMMING TRANSFER CONTROLLER
42
CONTROL LINE FOR MEMORY ACCESS FOR PROGRAMMING (47)
46
44
ADDRESS BUS (20)
DATA BUS (22)
CMOS RAM OR EROM
16
14
POSTAGE METER
SYSTEM DATA PROCESSOR
18
WEIGHT INPUT
MAIL CLASS INPUT
DESTINATION ZONE INPUT
24
26
28

SYSTEM FOR UPDATING POSTAL RATE INFORMATION UTILIZED BY REMOTE MAIL PROCESSING APPARATUS

RELATED APPLICATIONS

The present invention relates to a system for updating postage rate data in memories associated with remote mail processing apparatus through telephone transmission lines. In copending applications, Ser. Nos. 764,054 and 763,999, filed simultaneously herewith, both entitled SYSTEM FOR REMOTELY RESETTING POSTAGE RATE MEMORY, and both assigned to the assignee of the present invention, a system for updating postage rate information utilizing carrier wave transmission is disclosed.

BACKGROUND OF THE INVENTION

The present invention relates to a system for replacing obsolete postal rate data with new data which is used by remote mail processing apparatus.

The postage required to send a piece of mail from its point of origination to its destination is a function of the distance between those two points, its weight, and its class. Sophisticated mail handling apparatus, which are far more efficient than manual handling methods, are now available and usually include a data process capable of correlating information on weight, destination, and class of the mail being handled to automatically compute its required postage. Such apparatus, which is installed at a user's site, may include a scale which weighs the mail and loads weight information into the data processor and a keyboard through which destination and class information are loaded into the data processor. The postal destination may be expressed directly in terms of postal destination zone information or indirectly in terms of postal zip code information which is converted by the data processor into zone information.

The data processor includes a memory which stores postal rate information as a function of mail weight, class, and destination zone and generates an output signal indicative of the required postage for each piece of mail handled.

The mail processing apparatus may also include a postage printing device, that is, a postage meter, which is automatically set to print an appropriate amount of postage in response to the output signal generated by the data processor. The postage may be printed by the meter directly on each piece of mail or on a tape for transfer to each piece of mail.

From time to time certain data stored in the memory of the data processor becomes obsolete. For example, changes in the amount of postage required for a given piece of mail may result from changes in postal destination zone designations, mail and weight classifications, and postal rates or any combination of these factors. When the factors are changed, the obsolete data must be replaced with new data if the mail processing apparatus is to work properly. In the past, in order to do this, the mail handling apparatus may have been physically taken to a central data processing unit so that the memory could be reprogrammed. Alternatively, the memory may have been modular in construction so that it alone could be taken to the central data processing unit to be reprogrammed. Either operation is inconvenient. Moreover, the U.S. Postal Service must rely upon users of the apparatus to return the apparatus or its memory for updating.

SUMMARY OF THE INVENTION

In a preferred embodiment, to be described below in detail, the system of the present invention is capable of replacing obsolete data used by a remote mail processing apparatus with new data without physically moving the apparatus to the location of a central data processing unit and without removing the memory in which such data is stored and transporting it to the central data processing unit. In particular, the new data is transmitted from the central data processing unit directly to the remote mail handling apparatus. Therefore, data updating is both easy and convenient. Furthermore, updating of obsolete data with the system of the present invention can be conducted more quickly on a more comprehensive scale reaching virtually all mail processing apparatus in the field. Thus, the Postal Service can more readily be assured that apparatus are equipped to calculate postage at any given time.

In its preferred embodiment, the system comprises a central data processing unit for generating the new data as electronic signals. An encoder translates the electronic data signals into a transmittable form such as multifrequency tone signals. These tone signals are transmitted to the remote location of the mail processing apparatus by, for example, telephone transmission lines which, of course, already constitute a well established communications network.

The multifrequency tone signals are ultimately conducted to a telephone receiver-transmitter at the site of the processing apparatus. The receiver-transmitter is linked to an acoustical coupler that is in turn connected to a multifrequency tone-to-data decoder that reconverts the multifrequency tone signals to electronic new data signals.

The system further comprises a memory incorporated in the remote mail processing apparatus for storing obsolete and new data at a plurality of storage locations. A programming transfer controller interconnects the decoder and the memory. As it receives the new data, the controller sequentially addresses each of the locations in which obsolete data is stored, erases the obsolete data from the addressed locations, and loads new data into the addressed location optionally the controller may erase the entire memory before it commences to load new data.

In this manner, obsolete data stored in any location in the memory of the mail processing apparatus may be replaced sequentially with updated, new data so that the apparatus can properly calculate postage. Further, the system of the present invention has the advantage of being able to simultaneously update data stored in a great number of mail processing apparatus without requiring movement of either the apparatus or of central data processing equipment.

Accordingly, it is an object of the present invention to provide a system for replacing obsolete postal rate data with new data used by a mail processing apparatus to calculate postage at a location remote from the central data generating or processing unit.

Other objects, aspects, and advantages of the present invention will be pointed out in or will be understood from the following detailed description provided below in conjunction with the accompanying drawings.

BRIEF DESCRIPTION OF THE DRAWING

The single FIGURE is a diagrammatic representation of the system of the present invention for replacing obsolete postal rate data with new data at a remote mail handling apparatus.

DETAILED DESCRIPTION OF THE PREFERRED EMBODIMENT

As shown in the FIGURE, the system of the present invention has three basic components, namely, a central data generating station 10, a remote data processing apparatus 12, and a postage meter 14 for imprinting mail with appropriate postage. The remote data processing apparatus 12 and postage meter 14 are together considered to be a mail processing apparatus which takes raw data representative of various pieces of mail, computes postage in accordance therewith, and imprints the postage on the mail.

In order to understand the system of the present invention it is first helpful to explain the components of the mail processing apparatus which are already known. This apparatus includes a memory which may be in the form of a complementary symmetry metal oxide semiconductor, random access memory 16 (CMOS RAM) which is connected to a system data processor 18 such as a Rockwell International P P S 4/2 by an address bus 20 and a data bus 22. Alternatively, the memory 16 may be nonvolatile, electrically programmable, erasable, read only memory (EROM). However, for purposes of this description it will be assumed that the memory is a CMOS RAM. The CMOS RAM has a plurality of memory storage locations, each of which stores a bit of information that may be retrieved by an appropriate signal, and may be equipped with a battery back-up to maintain information stored in it over extended periods of time when the apparatus is not in use.

Operation of the system data processor 18 is controlled by three input signal generators including a weight input signal generator 24, a mail class input generator 26, and a destination zone input generator 28. The weight input generator 24 may be a scale electronically coupled to the system data processor 18. The mail class 26 and destination zone 28 input generators are most conveniently in the form of a keyboard having keys representative of the digits "0" to "9" as well as various keys representative of various mail classes. Further, the CMOS RAM may be programmed with data permitting it to convert zip code information into zone information for ultimate calculation of required postage. Therefore, the destination zone input generator may be equipped to signal the memory for conversion of postal zip code information to postal zone information.

Signals from the three input generators 24, 26, 28, are correlated by the system data processor 18 which then addresses a given storage location in the CMOS RAM 16 through the address bus 20. The data stored at that location in the form of a postage amount is retrieved from CMOS RAM 16 through the data bus 22 and is conducted back to the system data processor 18 where it may be loaded into a display such as a liquid crystal or light emitting diode (LED) display (not shown). This data output may also be used to generate a signal to set postage meter 14 or may be read by an operator who in turn manually sets a postage meter to print a corresponding amount of postage.

Accordingly, the remote mail processing apparatus correlates three forms of input information, of which postage is a function, addresses a memory in accordance with the correlated input information and retrieves postage data from the addressed location. The retrieved data is used to signal a postage meter in order to correctly imprint mail with a proper amount of postage. The system of the present invention is used to update the data stored in the memory 16.

As noted above, the system of the present invention includes a central data generating station 10 which comprises a central data processing unit 30 such as a Digital Equipment Corp. P D P 11. This unit is programmed whenever necessary to generate new data which supersedes that stored at remote mail processing apparatus 12. For example, as noted above, when the U.S. Postal Service changes its postal rate schedule, data stored at the remote mail processing apparatus must correspondingly be changed. Similarly, should the Postal Service change its destination zone designations or mail classifications, similar data changes must be made. The central data processing unit 30 is programmed with all of the updated postal rate data at the central data generating station 10. The central data processing unit 30 is programmed to output the new postal rate data to data buffers in the appropriate format for outputting to any of the remote data processing apparatus 12. The revised postal rate data is sent out in serial format including start or header bits, control bits, the revised postal rate data bits, and stop bits.

New data generated by the central data processing unit is conducted on line 31 to a data-to-multifrequency tone encoder-decoder 32 also included in the central data generating station. The encoder-decoder converts the new data, which is preferably generated by the central processing unit in binary form, to multifrequency tones capable of being transmitted along telephone transmission lines. Specifically, this data may be encoded as one of 12 standardized tone signals generated by combination of two of seven standardized tones currently employed by the Bell Telephone System touch-tone dialing system.

Once encoded as multifrequency tone signals, the data is transmitted over telephone transmission lines 34 to a telephone receiver-transmitter 36. The receiver-transmitter converts the signals to familiar acoustical tones.

The remote data processing apparatus 12 is equipped with an acoustical coupler 38 which may be linked to the telephone receiver-transmitter. The acoustical coupler reconverts the acoustical multifrequency tone signals to electronic multifrequency tone signals that are in turn conducted by line 39 to a multifrequency tone-to-data decoder-encoder 40. The decoder-encoder reconverts the tone signals to binary form for loading into memory 16 in a manner described below.

The remote data processing apparatus 12 further includes a programming transfer controller 42 which interconnects memory 16 and the multifrequency tone-to-data decoder-encoder 40 to control loading of new data into the memory 16. This controller 42 is connected to both the memory address bus 20 and data bus 22 and is connected to the decoder-encoder on line 41. The transfer controller 42 is operable in a standby mode and in a programming mode which are selected by the position of a security switch 46 in a control line 44. When switch 46 is open the controller 42 is in the standby mode and is incapable of disturbing the memory. Therefore, accidental erasure is prevented. However, when it becomes necessary to updata data stored in the memory, switch 46 is closed and the controller becomes operable to perform its data transfer function.

The transfer controller 42 is also connected to the system data processor 18 by a control line 47. Through a signal generated on line 47 the controller causes the system data processor 18 to release control of the memory 16 so that new data reflecting current postage rates may be entered into the memory.

The transfer controller is capable of addressing each location in the memory in much the same fashion as is the system data processor 18. New data generated by the central data processing unit 30 also includes information indicative of the locations in which superseded obsolete data is stored. When each location is addressed, obsolete data stored therein is erased and new data is subsequently loaded into it from the central data processing unit through the component link including the data bus 22 described above.

As shown in the FIGURE, return lines 31', 34', 39' and 41' are capable of conducting signals back through the various components described above. Accordingly, the central data processing unit can index by means of the transfer controller from one storage location in the CMOS RAM 16 to the next in which obsolete data is stored. The indexing continues through all locations in which such data is stored unit the CMOS RAM is completely loaded with updated data as necessary.

The exchange of data from the central data processing unit 30 to the programming transfer controller 42 may be in accordance with the following typical procedure:

An operator at the remote data processing apparatus 12 telephones the central data generating station 10 and awaits a signal which indicates that the station is about to proceed with data transfer. The operator then places the telephone receiver into the acoustical coupler 38.

The serial flow of tone encoded data over the telephone lines is converted from tone encoded data to digital levels at the decoder-encoder 40 and then proceeds to the programming transfer controller 42. At the controller 42, the input signal from the central data processing unit 30 is recognized and an acknowledging signal is transmitted back to the central data processing unit 30 from the controller 42 on the output line 41'. Receipt of this acknowledgment signal at the processing unit 30 commences the data transfer process.

Commercially available automatic dialing equipment may be employed to obviate the need for operator intervention. Thus, data transfer during off hours may be utilized to reduce operating costs.

The controller 42 may request blocks of data to be retransmitted in the event that errors are detected in data transmission.

The received data may be written directly into the CMOS RAM 16 or be stored at the controller 42 for transfer at the end of the telephone link.

The switch 46 may be a manual operator actuated switch or automatically controlled by the controller 42. In either event, such switch 46 controls the write lines of the CMOS RAM 16 so tha the memory will not be inadvertently erased or overwritten during accessing by the system processor 18.

The control line 47 is used by the controller 42 to deactivate the system data processor 18 during the data transfer writing procedure. Such control is necessary in order to prevent competition for the address and data lines 20, 22 by both the system processor 18 and the controller 42 which, would result in data mixing of the two systems.

The controller 42 enters the revised postal rate data into the CMOS RAM 16 in an orderly fashion. For example, first it addresses the byte location it wishes to write; then it writes the data. It increments to the next byte address and writes that byte and subsequently increments to all further byte addresses until it has written all the data bytes.

Accordingly, it can be seen from the above description that a mail processing apparatus may be updated with new data that supersedes obsolete data without removing it to a central data processing location. Moreover, the memory need not be removed to such a data processing location.

While a telephone link between the central data processing station 10 and the remote data processing apparatus 12 is disclosed above, it is to be understood that other remote data transmission techniques may be employed. For example, radio signal transmission may be used. Alternatively, the remote data processing apparatus may be directly connected to the data generating station by transmission lines without acoustical conversion of signals.

In the system of the present invention the data-to-multifrequency tone encoder-decoder 32 and the decoder-encoder 40 may both be modems which include an acoustical coupler such as that available from Multi-Tech Systems, Inc., having Model No. FN30. The programming transfer controller, which is a micro processor, may be of the type available from General Instrument having Model No. PIC 1650. Finally, the CMOS RAM can be one such as Model No. TF4380A available from Texas Instruments. An electrically reprogrammable ROM available from General Instruments having Part No. 3400 EAROM can be used also. Of course, components equivalent to those mentioned above may also be used.

While a specific embodiment of the present invention has been described above in detail, it is to be understood that this is for purposes of illustration. Modifications may be made to the described system for replacing obsolete data at a remote mail processing apparatus with new data by those skilled in the art in order to adapt this system to particular applications.

What is claimed is:

1. A system for replacing obsolete postal rate data with revised postal rate data carried in a mail processing apparatus adapted to calculate postage charges, said system comprising:

(a) central data processing means adapted to generate revised postal rate data in binary format;

(b) encoder means comprising a modem receiving the revised postal rate data in binary format and being adapted to convert such revised postal rate data into tone signals;

(c) means receiving the tone signals and adapted to transmit the tone signals from the encoder to the mail processing apparatus, the transmitting means comprising telephone lines;

(d) decoder means comprising a modem receiving the telephone line transmitted tone signals and adapted to translate said tone signals back into revised postal rate data in binary format;

(e) the mail processing apparatus including a memory and a data processor, the memory being adapted for sequentially storing postal rate data at a plurality of storage locations, the data processor accessing the postal rate data stored in the memory for the purpose of calculation of postage charges;

(f) the remote mail processing apparatus further including a programming transfer controller, the controller interconnecting the decoder means and the memory, the controller receiving the revised postal rate data in binary format from the decoder means and being adapted to:

(1) sequentially address storage locations in the memory, (2) erase the data from the addressed storage location, and (3) load revised postal rate data into each sequentially addressed location; and (g) means to prevent the data processor from accessing the memory when the controller receives the revised postal rate data and for permitting the data processor to access the memory after the revised postal rate data has been loaded into the memory.

2. A system for revising postal rate data constructed in accordance with claim 1 wherein the memory comprises an electrically programmable erasable read only memory.

3. A system for revising postal rate data constructed in accordance with claim 1 wherein the memory comprises a random access memory.

* * * * *